(12) United States Patent
Baldovino et al.

(10) Patent No.: US 11,597,354 B2
(45) Date of Patent: Mar. 7, 2023

(54) SENSOR HEATING

(71) Applicant: Ford Global Technologies, LLC, Dearborn, MI (US)

(72) Inventors: Segundo Baldovino, Novi, MI (US); Prashant Dubey, Canton, MI (US); Venkatesh Krishnan, Canton, MI (US); Mahmoud Yousef Ghannam, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1120 days.

(21) Appl. No.: 16/217,333

(22) Filed: Dec. 12, 2018

(65) Prior Publication Data

US 2020/0189531 A1    Jun. 18, 2020

(51) Int. Cl.
| | | |
|---|---|---|
| *B60S 1/06* | (2006.01) | |
| *B60S 1/66* | (2006.01) | |
| *B60S 1/02* | (2006.01) | |
| *B05B 1/24* | (2006.01) | |
| *F25B 21/02* | (2006.01) | |
| *B60S 1/54* | (2006.01) | |
| *H05B 3/84* | (2006.01) | |

(52) U.S. Cl.
CPC ............ *B60S 1/66* (2013.01); *B05B 1/24* (2013.01); *B60S 1/026* (2013.01); *B60S 1/544* (2013.01); *F25B 21/02* (2013.01); *H05B 3/84* (2013.01); *H05B 2203/022* (2013.01)

(58) Field of Classification Search
CPC .. B60S 1/66; B60S 1/026; B60S 1/544; B60S 1/485; B60S 1/56; B60R 2011/004; B05B 1/24; B05B 9/002; B05B 9/0423; F25B 21/02; H05B 3/84; H05B 3/02; H05B 3/145; H05B 2203/022; H05B 1/0236
See application file for complete search history.

(56) References Cited

U.S. PATENT DOCUMENTS

| | | | |
|---|---|---|---|
| 4,212,425 A | 7/1980 | Schlick | |
| 6,220,524 B1 | 4/2001 | Tores et al. | |
| 9,457,770 B2 | 10/2016 | Kong et al. | |
| 2003/0066907 A1* | 4/2003 | Drouillard | B60S 1/522 239/284.1 |
| 2013/0146577 A1 | 6/2013 | Haig et al. | |
| 2016/0161831 A1* | 6/2016 | Samardzic | B60R 11/04 396/428 |
| 2018/0361998 A1* | 12/2018 | Renaud | B60R 11/04 |

FOREIGN PATENT DOCUMENTS

| | | |
|---|---|---|
| DE | 102010042978 A1 | 5/2012 |
| WO | 2018149591 A1 | 8/2018 |

* cited by examiner

*Primary Examiner* — Shawntina T Fuqua
(74) *Attorney, Agent, or Firm* — Frank A. MacKenzie; Bejin Bieneman PLC (57) ABSTRACT

An apparatus includes an exterior surface including an aperture, a sensor defining a field of view oriented through the aperture, a nozzle shell on the exterior surface and including a nozzle panel facing the aperture, and a heating element disposed in or on the nozzle panel. The nozzle panel includes a nozzle.

20 Claims, 6 Drawing Sheets

SENSOR HEATING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. The sensors can be radar sensors, scanning laser range finders, light detection and ranging (LIDAR) devices, and/or image processing sensors such as cameras.

DETAILED DESCRIPTION

An apparatus includes an exterior surface including an aperture, a sensor defining a field of view oriented through the aperture, a nozzle shell on the exterior surface and including a nozzle panel facing the aperture, and a heating element disposed in or on the nozzle panel. The nozzle panel includes a nozzle.

The heating element may be a resistive heating element. The heating element may have a resistance that is positively related to voltage applied to the heating element.

The heating element may be a thin film. The heating element may include carbon ink. The heating element may include a plurality of electrically connected patches of carbon ink.

The apparatus may further include an external panel including the exterior surface, and the sensor may be disposed on an opposite side of the external panel from the exterior surface.

The heating element may extend completely around the nozzle.

The nozzle may be an air nozzle, and the nozzle shell may include a liquid nozzle. The heating element may extend around the air nozzle and around the liquid nozzle.

The nozzle may be slot-shaped. The nozzle may be oriented substantially parallel to the exterior surface.

The nozzle shell may include a rounded shell panel bordering the nozzle panel and the exterior surface. The shell panel may include a first edge extending along the nozzle panel from the exterior surface to the exterior surface, and a second edge extending along the exterior surface from the nozzle panel to the nozzle panel.

The apparatus may further include a thermoelectric cooler thermally coupled to the heating element.

The apparatus may further include a voltage source electrically coupled to the heating element and a controller communicatively coupled to the voltage source. The controller may be programmed to activate the voltage source for a preset time in response to receiving data indicating that ambient temperature is below a temperature threshold.

The controller may be programmed to activate the voltage source for a preset time in response to receiving data indicating a presence of ice. The controller may be communicatively coupled to the sensor and may be programmed to determine the presence of ice based on data received from the sensor.

With reference to the Figures, an apparatus 32 on a vehicle 30 includes an exterior surface 34 including at least one aperture 36, at least one sensor 38 defining a field of view oriented through the respective aperture 36, at least one nozzle shell 40 on the exterior surface 34 and including a nozzle panel 42 facing the respective aperture 36, and at least one heating element 44 disposed in or on the respective nozzle panel 42. Each nozzle panel 42 includes an air nozzle 46.

The apparatus 32 provides heating and ice removal for the sensor 38. The apparatus 32 can self-regulate the amount of heat provided, e.g., a high amount of heat initially and a reduced amount after the sensor 38 has been warmed. The apparatus 32 can provide heating evenly, i.e., with a low likelihood of hot spots. The apparatus 32 can prevent the buildup of ice, keeping the sensor 38 clear and able to provide accurate data.

Figure 1:
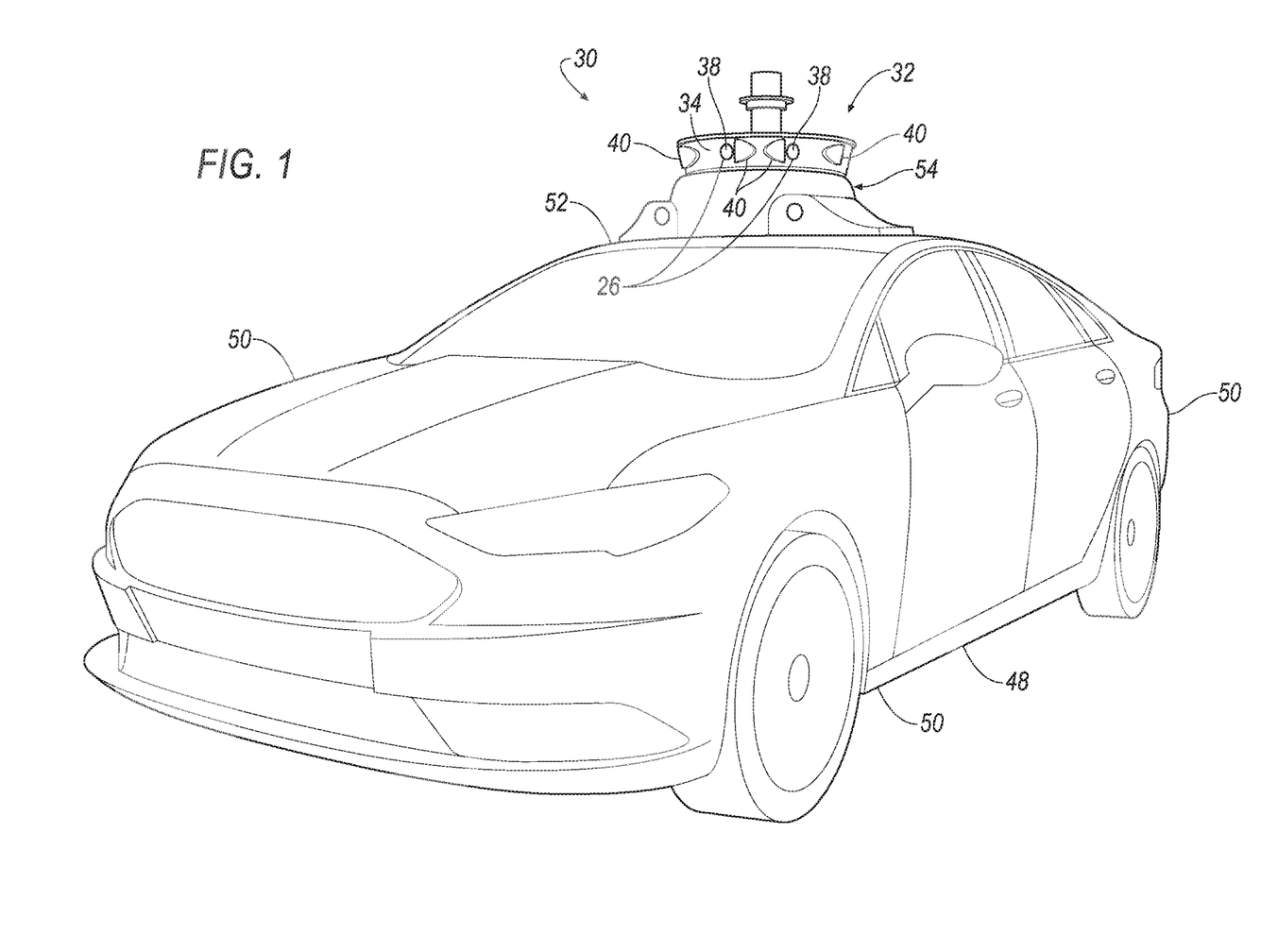
FIG. 1 is a perspective view of an example vehicle.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based on data received from the sensors 38. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 48. The vehicle 30 may be of a unibody construction, in which a frame and the body 48 of the vehicle 30 are a single component. The vehicle 30 may, alternatively, be of a body-on-frame construction, in which the frame supports the body 48 that is a separate component from the frame. The frame and the body 48 may be formed of any suitable material, for example, steel, aluminum, etc. The body 48 includes body panels 50, 52 partially defining an exterior of the vehicle 30. The body panels 50, 52 may present a class-A surface, e.g., a finished surface exposed to view by a customer and free of unaesthetic blemishes and defects. The body panels 50, 52 include, e.g., a roof 52, etc.

Figure 2:
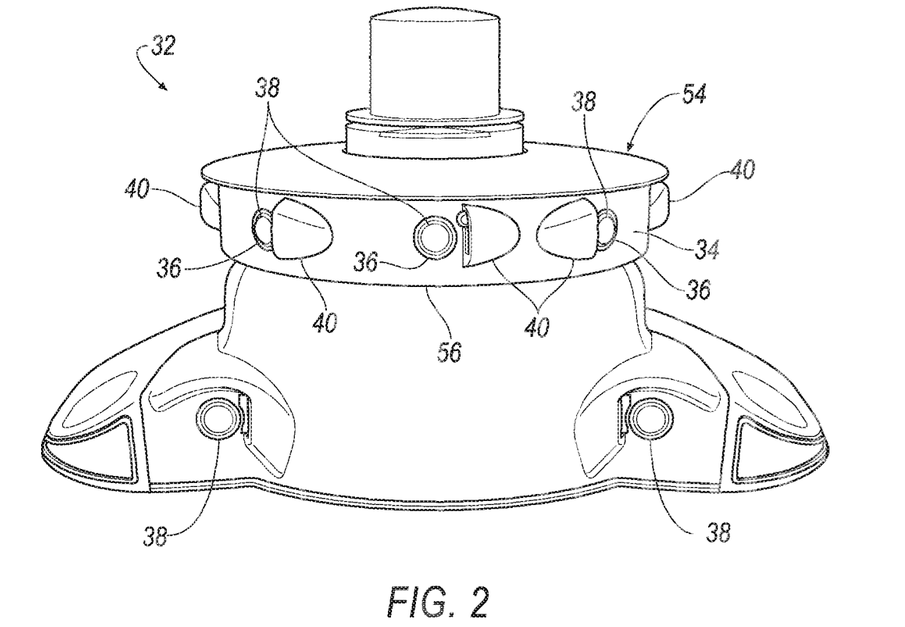
FIG. 2 is a front view of an example housing on the vehicle.

With reference to FIGS. 1 and 2, a housing 54 for the sensors 38 is attachable to the vehicle 30, e.g., to one of the body panels 50, 52 of the vehicle 30, e.g., the roof 52. For example, the housing 54 may be shaped to be attachable to the roof 52, e.g., may have a shape matching or following a contour of the roof 52. The housing 54 may be attached to the roof 52, which can provide the sensors 38 with an unobstructed field of view of an area around the vehicle 30. The housing 54 may be formed of, e.g., plastic or metal.

With reference to FIG. 2, the housing 54 includes an external panel 56. The external panel 56 serves as a circumferential outer wall for the housing 54, and the external panel 56 has a cylindrical shape defining a vertically oriented axis. The external panel 56 includes the exterior surface 34. The exterior surface 34 is the outward-facing surface of the external panel 56. The exterior surface 34 is exposed to the ambient environment.

The housing 54 includes the apertures 36. The apertures 36 are holes in the housing 54 leading from inside the housing 54 to the ambient environment. The external panel 56, i.e., the exterior surface 34, includes the apertures 36. The apertures 36 are through the external panel 56 and exterior surface 34. The apertures 36 are circular in shape. The housing 54 includes a plurality of apertures 36, i.e., one aperture 36 for each of the respective sensors 38. Each sensor 38 has a field of view received through the respective aperture 36. The sensors 38 may extend into the respective apertures 36. For example, the aperture 36 may be concentric about a portion of the sensor 38.

The sensors 38 may detect the location and/or orientation of the vehicle 30. For example, the sensors 38 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 38 may detect the external world, e.g., objects and/or characteristics of surroundings of the vehicle 30, such as other vehicles, road lane markings, traffic lights and/or signs, pedestrians, etc. For example, the sensors 38 may include radar sensors, scanning laser range finders, light detection and ranging (LIDAR) devices, and image processing sensors such as cameras.

In particular, the sensors 38 disposed in the housing 54 may be one or more cameras arranged to collectively cover a 360° field of view with respect to a horizontal plane. The sensors 38 are fixedly attached directly or indirectly to the housing 54. The sensors 38 are fixed inside the housing 54. The sensors 38 are disposed on an opposite side of the external panel 56 from the exterior surface 34. Each sensor 38 defines a field of view oriented through the respective aperture 36, and the field of view of one of the sensors 38 may overlap the fields of view of the sensors 38 that are circumferentially adjacent to one another, i.e., that are immediately next to each other.

The nozzle shells 40 are disposed on the exterior surface 34 of the external panel 56. The housing 54 includes one nozzle shell 40 for each aperture 36, i.e., for each sensor 38. Each nozzle shell 40 is disposed near the respective aperture 36 and is positioned horizontally from the respective aperture 36. Each nozzle shell 40 is disposed in a vehicle-forward direction from the respective aperture 36, i.e., upstream from the respective aperture 36 relative to forward motion of the vehicle 30. Each nozzle shell 40 is oriented so that the respective nozzle panel 42 is facing the respective aperture 36.

Figure 3:
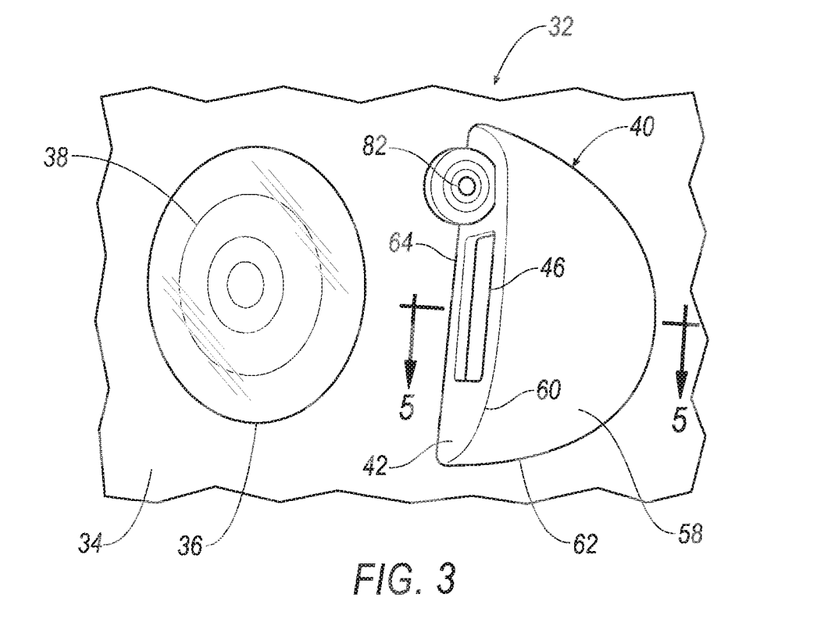
FIG. 3 is a perspective view of a portion of the housing.

With reference to FIG. 3, each nozzle shell 40 includes a shell panel 58 and the respective nozzle panel 42. The shell panels 58 each have a rounded shape. Each shell panel 58 borders the exterior surface 34 and the respective nozzle panel 42. The shell panel 58 includes a first edge 60 extending along the nozzle panel 42 from the exterior surface 34 to the exterior surface 34, and a second edge 62 extending along the exterior surface 34 from the nozzle panel 42 to the nozzle panel 42. The first edge 60 and the second edge 62 together define the boundary of the shell panel 58.

The nozzle panel 42 has a flat shape. The nozzle panel 42 borders the exterior surface 34 and the respective shell panel 58. The nozzle panel 42 includes the first edge 60 extending along the shell panel 58 from the exterior surface 34 to the exterior surface 34, and a third edge 64 extending along the exterior surface 34 from the shell panel 58 to the shell panel 58. The first edge 60 and the third edge 64 together define the boundary of the nozzle panel 42.

Figure 4:
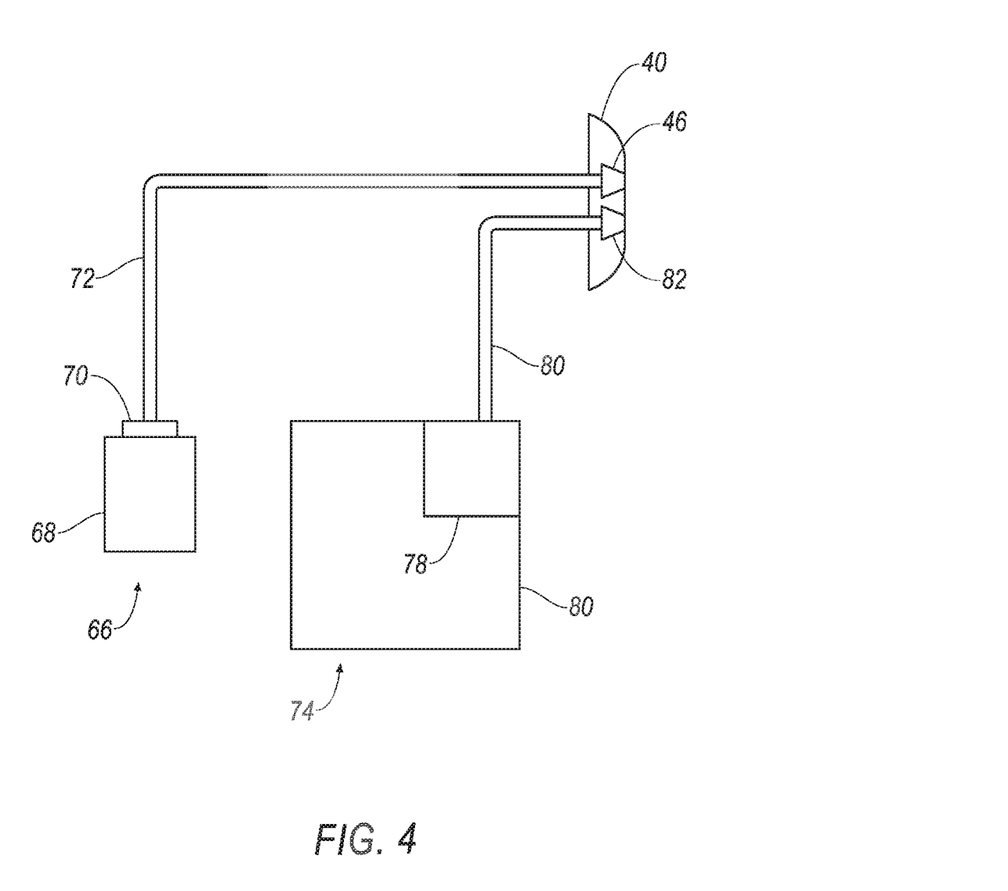
FIG. 4 is a diagram of an example cleaning system for a sensor in the housing.

With reference to FIG. 4, an air cleaning apparatus 66 includes a compressor 68, a filter 70, air supply lines 72, and the air nozzles 46. The compressor 68, the filter 70, and the air nozzles 46 are fluidly connected to each other (i.e., fluid can flow from one to the other) in sequence through the air supply lines 72.

The compressor 68 increases the pressure of a gas by reducing a volume of the gas or by forcing additional gas into a constant volume. The compressor 68 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 70 removes solid particulates such as dust, pollen, mold, dust, and bacteria from air flowing through the filter 70. The filter 70 may be any suitable type of filter, e.g., paper, foam, cotton, stainless steel, oil bath, etc.

The air supply lines 72 extend from the compressor 68 to the filter 70 and from the filter 70 to the air nozzles 46. The air supply lines 72 may be, e.g., flexible tubes.

Returning to FIG. 3, the nozzle panels 42 include the air nozzles 46. Each nozzle panel 42 includes one respective air nozzle 46. Each air nozzle 46 is aimed at, i.e., oriented or positioned to discharge at, the respective aperture 36 and sensor 38. Each air nozzle 46 is slot-shaped and has a length equal to greater than twice its width, and each air nozzle 46 is oriented substantially parallel to the exterior surface 34. Each air nozzle 46 is oriented vertically relative to the vehicle 30. Each air nozzle 46 is vertically centered with respect to the respective nozzle panel 42.

With reference to FIG. 4, a liquid cleaning apparatus 74 of the vehicle 30 includes a reservoir 76, a pump 78, liquid supply lines 80, and liquid nozzles 82. The reservoir 76, the pump 78, and the liquid nozzles 82 are fluidly connected to each other (i.e., fluid can flow from one to the other). The liquid cleaning apparatus 74 distributes washer fluid stored in the reservoir 76 to the liquid nozzles 82. "Washer fluid" refers to any liquid stored in the reservoir 76 for cleaning. The washer fluid may include solvents, detergents, diluents such as water, etc.

The reservoir 76 may be a tank fillable with liquid, e.g., washer fluid for window cleaning. The reservoir 76 may be disposed in a front of the vehicle 30, specifically, in an engine compartment forward of a passenger cabin. The reservoir 76 may store the washer fluid only for supplying the sensors 38 or also for other purposes, such as supply to a windshield.

The pump 78 may force the washer fluid through the liquid supply lines 80 to the liquid nozzles 82 with sufficient pressure that the washer fluid sprays from the liquid nozzles 82. The pump 78 is fluidly connected to the reservoir 76. The pump 78 may be attached to or disposed in the reservoir 76.

The liquid supply lines 80 extend from the pump 78 to the liquid nozzles 82. The liquid supply lines 80 may be, e.g., flexible tubes.

Returning to FIG. 3, the nozzle shells 40 include the liquid nozzles 82. Each respective nozzle shell 40 includes one respective liquid nozzle 82. Each liquid nozzle 82 is aimed at, i.e., oriented to discharge at, the respective aperture 36 and sensor 38. Each liquid nozzle 82 is disposed vertically above or below the respective air nozzle 46.

Figure 5:
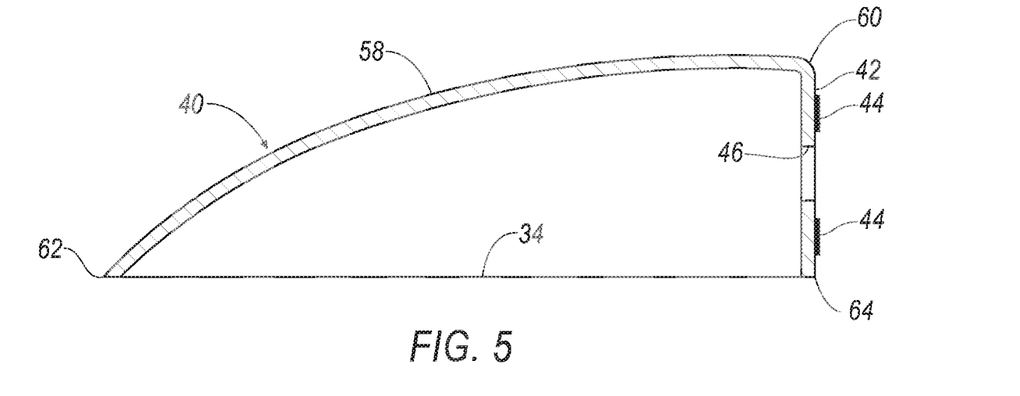
FIG. 5 is a cross-sectional view of an example nozzle shell.
Figure 6:
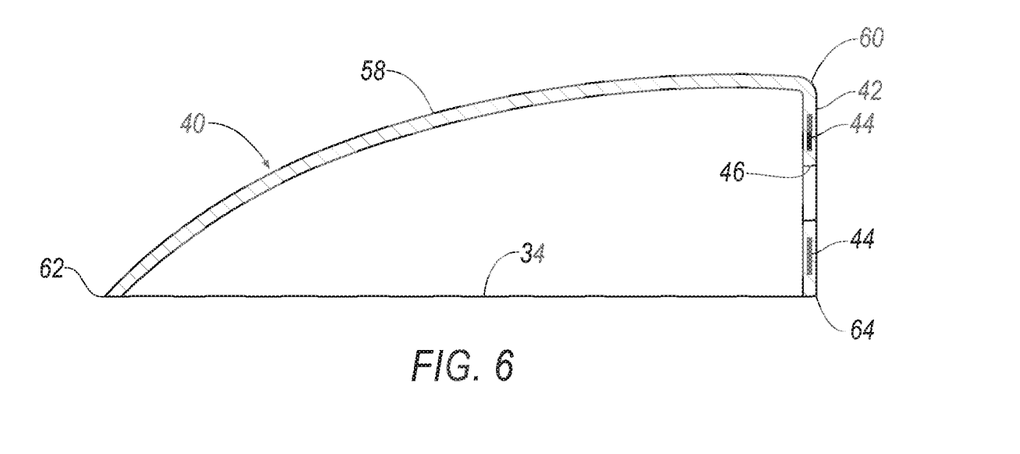
FIG. 6 is a cross-sectional view of another example nozzle shell.
Figure 7:
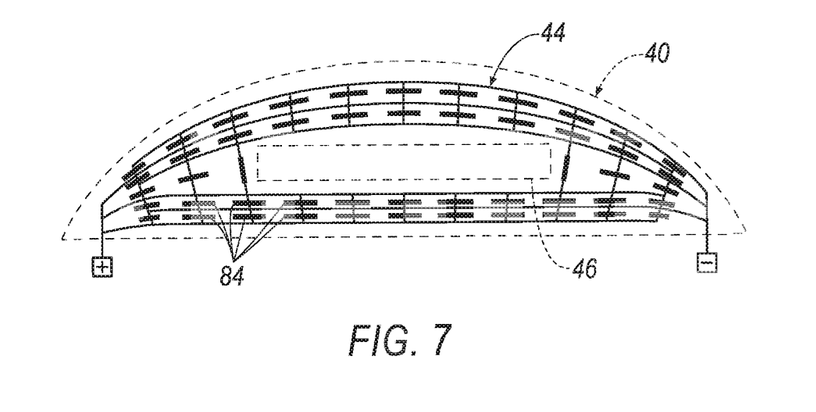
FIG. 7 is a plan view of a heating element.

With respect to FIGS. 5-7, the heating elements 44 are disposed in or on the nozzle panels 42. Each heating element 44 is disposed in or on the respective nozzle panel 42. Each heating element 44 extends completely around the respective air nozzle 46, and each heating element 44 extends around the respective liquid nozzle 82. The heating element 44 is a thin film. For example, the heating element 44 is a coating on the nozzle panel 42, e.g., may be applied to the surface of the nozzle panel 42 with a thermally conductive adhesive, as shown in FIG. 5. For another example, the heating element 44 is embedded in the nozzle panel 42, e.g., may be inserted in a mold before injection-molding the nozzle shell 40 in the mold, as shown in FIG. 6. As shown in FIG. 7, the heating element 44 includes a plurality of electrically connected patches 84 of, e.g., conductive carbon ink or silver nanowire.

The heating elements 44 are resistive heating elements. In other words, the heating elements 44 generate heat via electrical current flowing through a conductive material. Specifically, the heating elements 44 have a positive temperature coefficient (PTC), i.e., a resistance that is positively related to voltage applied to the heating element 44. For example, the heating elements 44 may contain a doped polycrystalline ceramic such as barium titanate ($BaTiO_3$). As a constant voltage is applied to the heating element 44 at an initial cool temperature, the resistance is initially low, and the current is initially high; as the heating element 44 generates heat, the temperature of the heating element 44 increases, and correspondingly the resistance increases and the current decreases, until the temperature, resistance, and current all reach a steady state. The steady-state temperature of the heating element 44 can therefore be controlled by selecting a voltage applied to the heating element 44.

Figure 8:
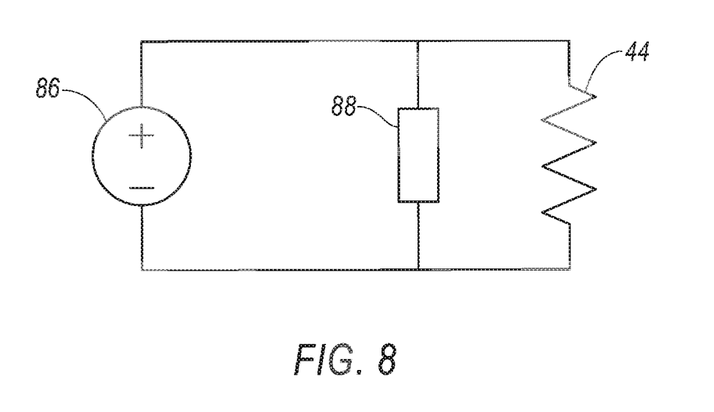
FIG. 8 is a circuit diagram of an example circuit for a heating element of the nozzle shell.

With reference to FIG. 8, a voltage source 86 is electrically coupled to the heating element 44. The voltage source 86 may be any type suitable for producing a selectable or constant voltage across terminals, e.g., batteries such as lithium-ion or lead-acid, capacitors, etc.

A thermoelectric cooler 88 is thermally coupled to the heating element 44. For the purposes of this disclosure, "thermally coupled" means attached such that heat may efficiently flow and both ends of the thermal coupling (if separate) are substantially the same temperature within a short time period. The thermoelectric cooler 88 operates according to the Peltier effect to generate a heat flux from a "cool" side to a "hot" side. The cool side of the thermoelectric cooler 88 is thermally coupled to the heating element 44. The thermoelectric cooler 88 can be activated to prevent the heating element 44 and/or the sensor 38 from overheating.

Figure 9:
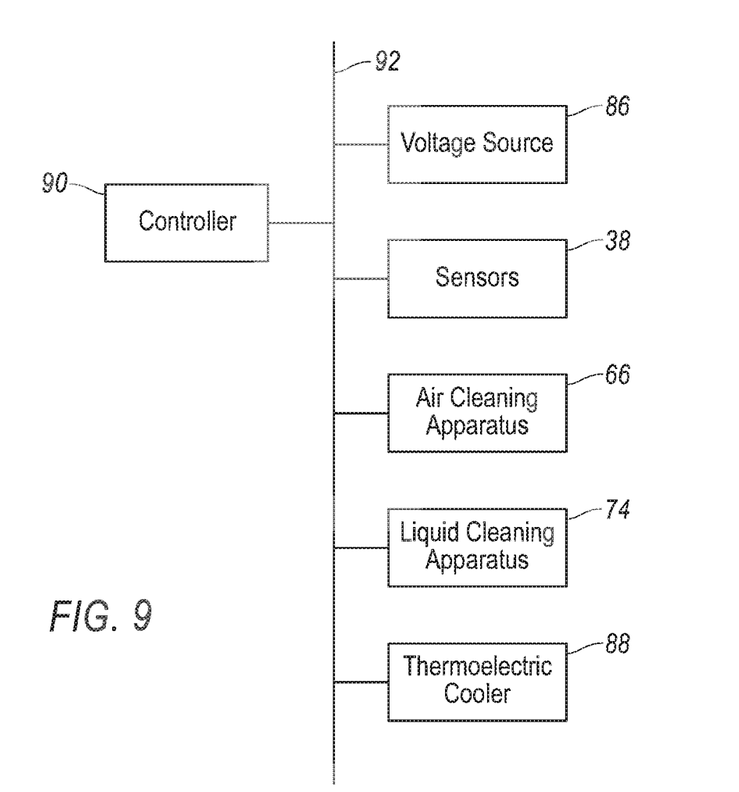
FIG. 9 is a block diagram of an example control system for the heating element.

With reference to FIG. 9, the apparatus 32 includes a controller 90. The controller 90 is a microprocessor-based controller. The controller 90 includes a processor, a memory, etc. The memory of the controller 90 includes media for storing instructions executable by the processor as well as for electronically storing data and/or databases.

The controller 90 may transmit and receive data through a communications network 92 such as a controller area network (CAN) bus, Ethernet, WiFi, Local Interconnect Network (LIN), onboard diagnostics connector (OBD-II), and/or by any other wired or wireless communications network. The controller 90 may be communicatively coupled to the voltage source 86, the sensors 38, the air cleaning apparatus 66, the liquid cleaning apparatus 74, the thermoelectric cooler 88, and other components via the communications network 92.

Figure 10:
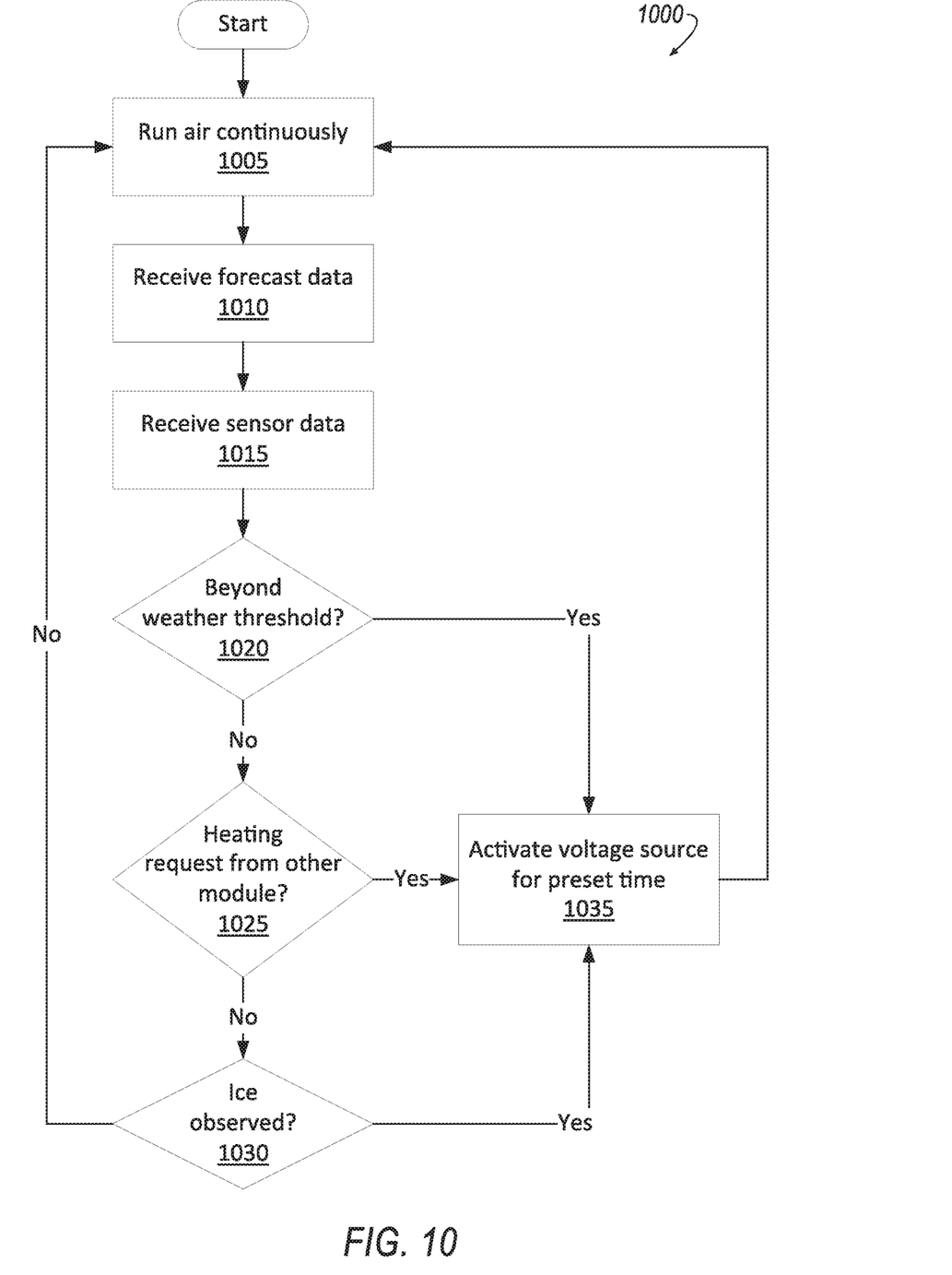
FIG. 10 is a process flow diagram of an example process for controlling the heating element.

FIG. 10 is a process flow diagram illustrating an exemplary process 1000 for controlling the heating element 44. The memory of the controller 90 stores executable instructions for performing the steps of the process 1000. As a general overview of the process 1000, the controller 90 is programmed to activate the voltage source 86, and thereby the heating element 44, when a weather variable is beyond a threshold, when a request is received from another control module, or when data from the sensors 38 indicates the presence of ice. The controller 90 runs the process 1000 independently for each respective sensor 38 and heating element 44.

The process 1000 begins in a block 1005, in which the controller 90 instructs the air cleaning apparatus 66, e.g., the compressor 68, to emit air through the air nozzle 46. A continuous flow of air is thus produced across the aperture 36 and the sensor 38.

Next, in a block 1010, the controller 90 receives weather data. The weather data may be generated by the sensors 38, sent to the controller 90 from a remote server, or both. The weather data can include weather variables such as ambient temperature, humidity, barometric pressure, etc.

Next, in a block 1015, the controller 90 receives data from the sensors 38. The data from the sensors 38 can include video or image data from cameras, three-dimensional mapping data from LIDAR or radar, etc.

Next, in a decision block 1020, the controller 90 determines whether data, e.g., the weather data, indicates that a weather variable or combination of weather variables is beyond a threshold. For example, the controller 90 may determine whether the ambient temperature is below a temperature threshold. The temperature threshold may be chosen to be above a temperature at which the sensors 38 would undergo degradation or damage by a safety factor, e.g., as specified by a sensor supplier and/or determined by empirical testing. In response to the data indicating that the weather variable is beyond the threshold (e.g., that the ambient temperature is below the temperature threshold), the process 1000 proceeds to a block 1035. In response to the data indicating that the weather variable is not beyond the threshold, the process 1000 proceeds to a decision block 1025.

In the decision block 1025, the controller 90 determines whether a request for heating has been received from another control module in the vehicle 30. For example, a control module may send a request for heating to the controller 90 in response to an occupant of the vehicle 30 activating a rear-window defroster. The set of triggers may be chosen based on which actions by other control modules are correlated with cold conditions. In response to a request for heating, the process 1000 proceeds to the block 1035. In response to finding no request for heating, the process 1000 proceeds to a decision block 1030.

In the decision block 1030, the controller 90 determines whether the sensor data indicates the presence of ice. The controller 90 determines the presence of ice based on data received from the sensors 38, e.g., from the respective sensor 38. For example, the controller 90 may use known algorithms to determine that a swath of pixels in image data received from the sensor 38 is unchanging over time compared to the remainder of the pixels in the image data, suggesting that a portion of the field of view of the sensor 38 has been covered by ice. The controller 90 may additionally analyze the color or brightness of the unchanging swath of pixels to differentiate between ice and other types of debris because ice is whiter and lighter than other types of debris. In response to failing to detect ice, the process 1000 returns to the block 1005 to continue to monitor for triggers for activating the voltage source 86. In response to determining that ice is present, the process 1000 proceeds to the block 1035.

In the block 1035, the controller 90 activates the voltage source 86 for a preset time. The preset time may be chosen to be sufficiently long to melt ice off of the sensor 38, based on performance data, e.g., defrost times under various conditions, for the heating element 44. If the voltage of the voltage source is selectable, the controller 90 selects the voltage based on the data used to trigger the activation of the voltage source 86, e.g., weather variables, number of pixels of the sensor 38 blocked by ice, etc. The voltages to select may be stored in a lookup table along with corresponding conditions for selecting that voltage, e.g., with corresponding ambient temperatures. The conditions, e.g., the corresponding ambient temperatures, may be chosen for the lookup table based on experimenting under various conditions to determine voltages that achieve an acceptably short defrost time for the sensor 38. After the block 1035, the process returns to the block 1005 to continue to monitor for triggers for activating the voltage source 86.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc.

have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus, comprising:
an exterior surface including an aperture;
a sensor defining a field of view oriented through the aperture;
a nozzle shell on the exterior surface and including a nozzle panel, including a nozzle, facing the aperture;
a heating element disposed in or on the nozzle panel; and
a thermoelectric cooler thermally coupled to the heating element.

2. The apparatus of claim 1, wherein the heating element is a resistive heating element.

3. The apparatus of claim 2, wherein the heating element has a resistance that is positively related to voltage applied to the heating element.

4. The apparatus of claim 1, wherein the heating element is a thin film.

5. The apparatus of claim 4, wherein the heating element includes carbon ink.

6. The apparatus of claim 5, wherein the heating element includes a plurality of electrically connected patches of carbon ink.

7. The apparatus of claim 1, further comprising an external panel including the exterior surface, wherein the sensor is disposed on an opposite side of the external panel from the exterior surface.

8. The apparatus of claim 1, wherein the heating element extends completely around the nozzle.

9. The apparatus of claim 1, wherein the nozzle is an air nozzle, and the nozzle shell includes a liquid nozzle.

10. The apparatus of claim 9, wherein the heating element extends around the air nozzle and around the liquid nozzle.

11. The apparatus of claim 1, wherein the nozzle is slot-shaped.

12. The apparatus of claim 11, wherein the nozzle is oriented substantially parallel to the exterior surface.

13. The apparatus of claim 1, wherein the nozzle shell includes a rounded shell panel bordering the nozzle panel and the exterior surface.

14. The apparatus of claim 13, wherein the shell panel includes a first edge extending along the nozzle panel from the exterior surface to the exterior surface, and a second edge extending along the exterior surface from the nozzle panel to the nozzle panel.

15. The apparatus of claim 1, further comprising a voltage source electrically coupled to the heating element and a controller communicatively coupled to the voltage source.

16. The apparatus of claim 15, wherein the controller is programmed to activate the voltage source for a preset time in response to receiving data indicating that ambient temperature is below a temperature threshold.

17. The apparatus of claim 15, wherein the controller is programmed to activate the voltage source for a preset time in response to receiving data indicating a presence of ice.

18. The apparatus of claim 17, wherein the controller is communicatively coupled to the sensor and is programmed to determine the presence of ice based on data received from the sensor.

19. An apparatus, comprising:
an exterior surface including an aperture;
a sensor defining a field of view oriented through the aperture;
a nozzle shell on the exterior surface and including a nozzle panel, including a nozzle, facing the aperture; and
a heating element disposed in or on the nozzle panel, wherein the heating element is a thin film.

20. An apparatus, comprising:
an exterior surface including an aperture;
a sensor defining a field of view oriented through the aperture;
a nozzle shell on the exterior surface and including a nozzle panel, including a nozzle, facing the aperture; and
a heating element disposed in or on the nozzle panel;
wherein the controller is programmed to activate the voltage source for a preset time in response to receiving data indicating at least one of a presence of ice or that ambient temperature is below a temperature threshold.

* * * * *